C. C. ARMSTRONG.
ELECTRICALLY HEATED COOKING DEVICE.
APPLICATION FILED JUNE 27, 1916.

1,263,359.

Patented Apr. 23, 1918.
3 SHEETS—SHEET 1.

Inventor:
Charles C. Armstrong
by Middleton Donaldson & Shaw
Att'ys.

C. C. ARMSTRONG.
ELECTRICALLY HEATED COOKING DEVICE.
APPLICATION FILED JUNE 27, 1916.
1,263,359.
Patented Apr. 23, 1918.
3 SHEETS—SHEET 2.
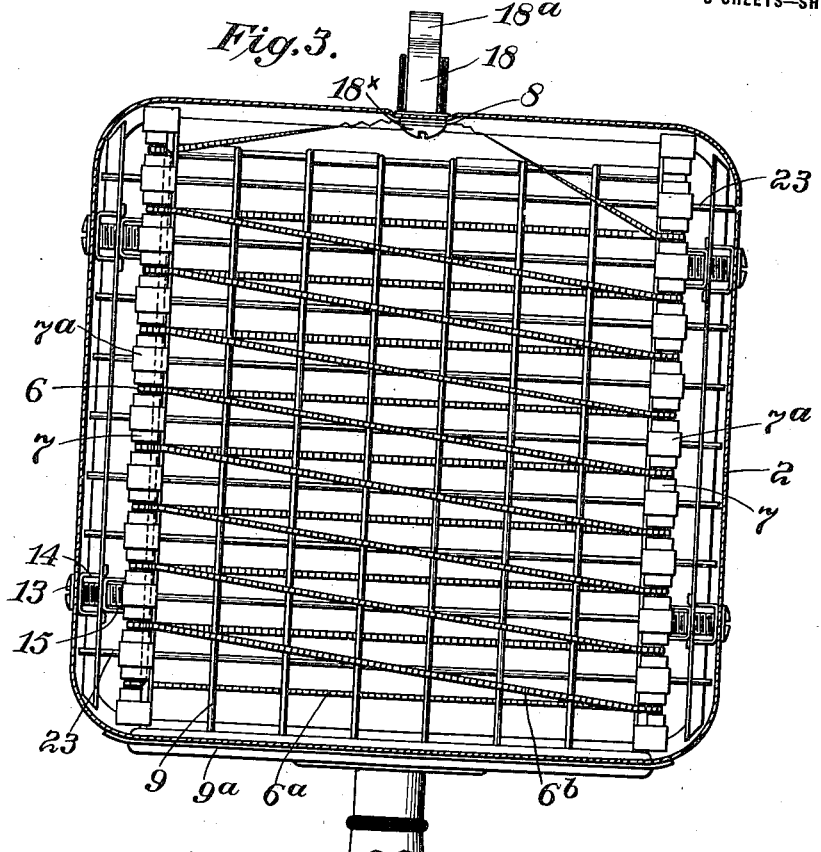
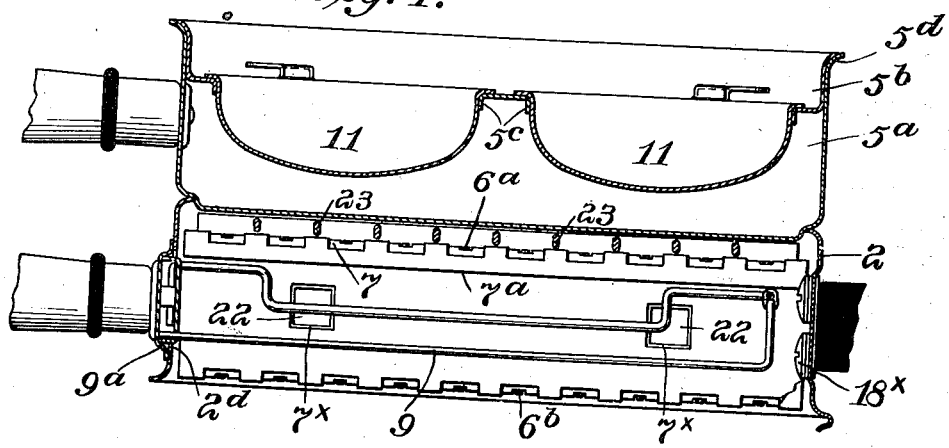
Inventor:
Charles C. Armstrong,
by *[signature]*
Atty's.

Inventor:
Charles C. Armstrong.

UNITED STATES PATENT OFFICE.

CHARLES C. ARMSTRONG, OF MARYSVILLE, OHIO.

ELECTRICALLY-HEATED COOKING DEVICE.

1,263,359.

Specification of Letters Patent.   Patented Apr. 23, 1918.

Application filed June 27, 1916.   Serial No. 106,244.

*To all whom it may concern:*

Be it known that I, CHARLES C. ARMSTRONG, a citizen of the United States, and resident of Marysville, Ohio, have invented certain new and useful Improvements in Electrically-Heated Cooking Devices, of which the following is a specification.

My present invention relates to electrically heated cooking devices and aims to provide an apparatus adapted for performing the various cooking operations, such as broiling, toasting, boiling and frying, in an expeditious manner and which apparatus shall be of attractive appearance and capable of use upon a dining room table without danger of injury to the table or liability of soiling the table cloth.

I have also aimed to provide a construction embodying a double heating element which will enable bread to be toasted simultaneously upon opposite sides, thereby securing a much quicker toasting action and in which the heat from both portions of said double heating element may be used for the purpose of heating the cooking or broiling chamber, or the vessel on top of the heater.

I have further aimed to provide a construction which may be made almost wholly of stamped sheet metal, thereby reducing the costs for materials and workmanship to a minimum and producing an article of maximum strength combined with minimum weight.

With these and other objects in view, the invention includes in the novel features of construction and arrangement and combination of parts hereinafter described and particularly defined by the appended claims, an embodiment of the invention being illustrated in the accompanying drawings, in which, Figure 1 is a vertical section through the complete stove viewed from the front thereof.

Fig. 3 is a bottom sectional plan on line 3—3 of Fig. 1.

Fig. 4 is a sectional elevation of the upper portion of the device showing the parts arranged for use in poaching eggs.

Figure 1:
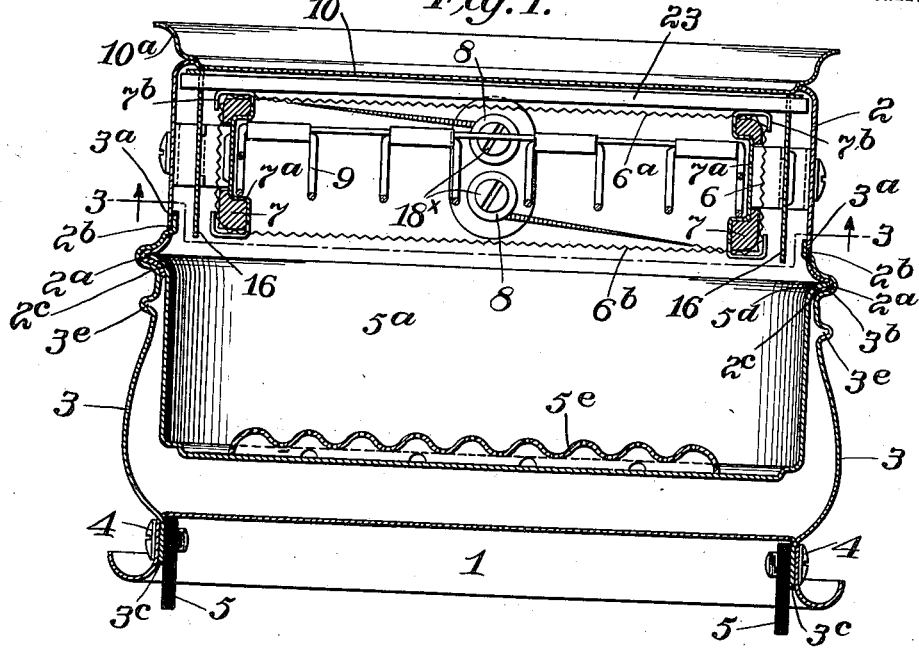
Figure 2:
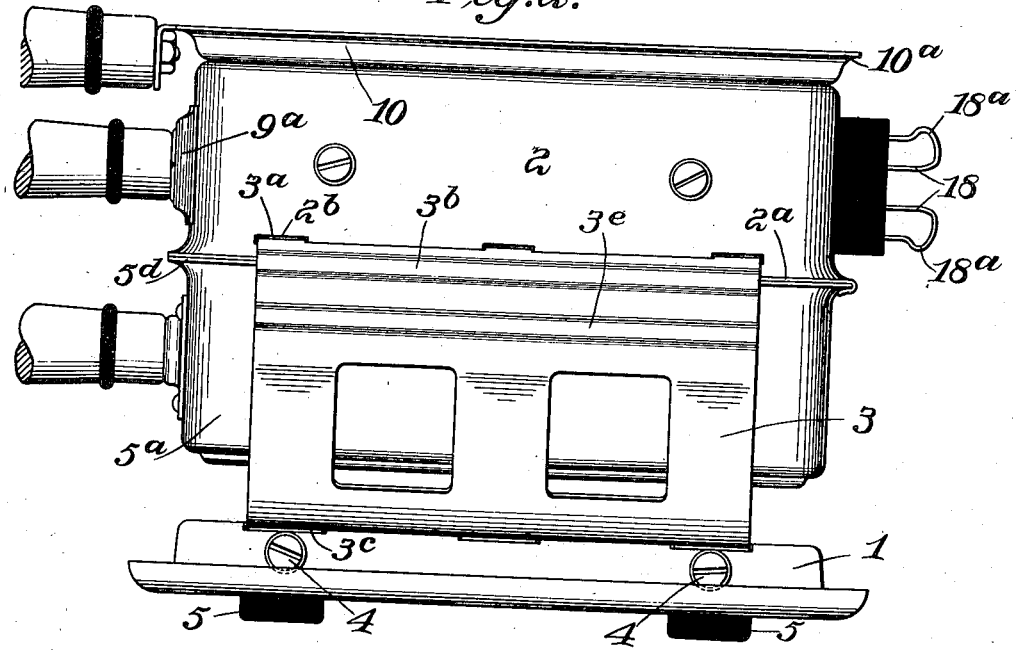
Fig. 2 is a side elevation of the same.
Figure 5:
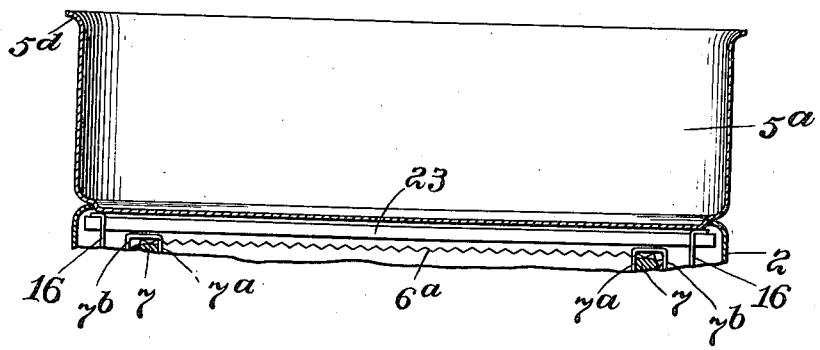
Fig. 5 is a detail section of the cooking vessel, as adapted for boiling.

Referring by reference characters to these drawings, the numeral 1 designates the base and 2 a frame for carrying an electric heating device, which frame is supported at a suitable distance above the base by sheet metal sides indicated at 3, forming therebetween a cooking chamber or space. The base is formed of pressed sheet metal, providing a central flat supporting surface, and a downwardly extending flange, curved outwardly and upwardly to form a trough, which will receive any overflow or drippings from articles being cooked and thereby serve to protect the table.

The frame 2 which carries the electric heating device is formed of pressed sheet metal and is provided with outwardly deflected marginal flanges 2ª and slots 2ᵇ in the walls immediately above these marginal flanges.

The sheet metal sides 3 are provided with tongues 3ª, adapted to be inserted in said slots before the lower edges of the sheet metal sides are secured to the base, said sheet metal sides at the time of insertion of the tongues being held in an inclined position, so that after the tongues are in place within the slots and the sides are swung downward the tongues are securely locked in the slots.

The said sheet metal sides are further provided with longitudinal grooves or channels 3ᵇ which are adapted, when said sides are swung down into vertical position, to receive the marginal flanges of the frame 2 and thus secure a further interlocking connection. The said metal sides are also provided with longitudinal grooves or channels 3ᵉ formed in the sides 3 located at a suitable distance from the lower edge of frame 2, which receive flanged edges 5ᵈ and 10ª of the cooking vessel 5ª and shallow pan 10 when these parts are not in use.

If desired, the said marginal flanges may be curved downward and inward, as shown, to form rounded beads 2ᶜ conforming in shape to the interior of the channels thus providing guides for receiving cooking or broiling vessel 5ª, or pan 10, when used as a reflector. These vessels when placed in grooves 2ᶜ effectively close the opening below frame 2.

The lower edges of the sheet metal sides 3 are provided with vertically depending tongues 3ᶜ, which are designed to pass through slots formed in the upper side corners of the base and they are held therein by suitable means, such as screws indicated at 4.

In order to prevent the heat of the metal base from being directly transmitted to the table upon which the cooking device is used, I provide feet or supports 5 of heat insulating material and these are preferably secured in position by the same screws which connect the tongues aforesaid.

The space between the base and the frame carrying the electric heater is of sufficient size to receive a cooking or broiling vessel $5^a$ of material capacity.

Within the frame 2 is secured an electric resistance heating device, which comprises two sets of resistance wires $6^a$ and $6^b$, which are arranged parallel to and spaced from each other. While I refer to these as two sets of resistance wires, or devices, it will be understood that they may be in the form of a continuous band 6, which is wound spirally around the parallel insulating bars 7, the ends of the wires being connected with suitable contact terminals indicated at 8. This winding of the resistance element around the two parallel insulating bars produces the upper and lower heating elements with a space between. The frame 2 is provided with an opening $2^d$ at the front end for the insertion of an openwork drawer or toaster 9, which is preferably in the form of a wire tray, as shown and adapted to hold for example a slice of bread to be toasted, and having an end plate $9^a$ adapted to close the opening. When this toaster is in place between the two sets of heating elements the bread will be simultaneously toasted upon opposite sides.

To prevent any waste of heat during the toasting operation I provide a pair of shallow pans or griddles made of pressed sheet metal, the same being designated by the numeral 10. These have marginal flanges $10^a$, which are designed to be slid into the guiding grooves or channels $2^c$ and $3^e$. These devices or pans 10 are also shaped so as to fit the top of the frame 2. Therefore, when the bread is being toasted, one of said pans 10 is inserted in the grooves $2^c$ and the other is placed on top of the frame 2, whereby the bread being toasted is kept in a closed space during the toasting operation, not only preventing waste of heat, but enabling the toasting to be more expeditiously accomplished.

As both sides of the bread is toasted at the same time all liability of the same to warp is avoided, and hence there is no danger of overtoasting or burning it in parts. This same arrangement of the pans 10 permits the one on top of frame 2 to be used as a griddle or frying pan.

Heating devices of this character are frequently used to prepare edibles to be used on or in connection with toast, such for example as poached eggs on toast, Welsh-rarebit, etc. Heretofore, so far as I am aware, the toast and its accompanying articles must be heated separately.

By placing the vessel $5^a$ on the top of the frame 2, in place of one of the cover pans 10, the eggs or other article may be cooked therein, while at the same time, the bread may be toasted in the closed space formed between the superposed vessel $5^a$ and underlying pan 10.

Another of the possible arrangements of the various parts permits broiling in vessel $5^a$, frying on griddle when placed on top of frame 2, and toasting in the closed space between griddle and vessel $5^a$; all of these cooking operations being accomplished simultaneously.

For the more convenient poaching of the eggs I provide the pan $5^a$ with a removable frame $5^b$ adapted to be supported a distance above the bottom of pan 5 and having openings $5^c$ adapted to receive the individual egg cooking vessels 11. These are provided with handles, by which they may be conveniently raised from the supporting member or frame. During the process of poaching or steaming eggs, one of the shallow pans 10 may be used as a cover.

In order to utilize the device for broiling purposes the pan $5^a$ which also is made of pressed sheet metal, has marginal flanges $5^d$ to engage the guiding grooves or channels $2^c$ and a supplemental bottom $5^e$ preferably of corrugated and perforated sheet metal adapted to support the meat to be broiled above the bottom of the pan and has a space below said supplemental bottom for the juices.

When pan $5^a$ is thus located below but in close proximity to the lower set of heating elements and the top of frame 2 is closed by one of the pans 10, all the heat is radiated downwardly from both these elements.

Both the vessel $5^a$ and the pans 10 have bottoms shaped to interlock with the frame as shown, to insure proper seating and guard against accidental displacement.

Figure 6:
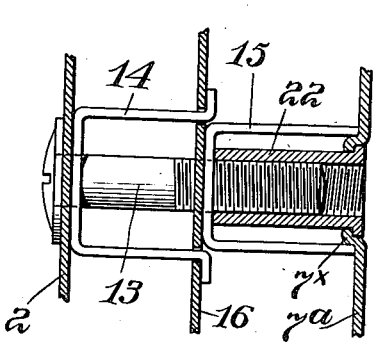
Fig. 6 is a detail sectional view of the supporting connection for the heating element within the casing.

The particular arrangement of the supporting and spacing means is shown more in detail in Fig. 6.

From this it will be seen that the plate or bar $7^a$ (which is of sheet metal) has a portion $7^x$ struck inwardly to form a socket of non-circular cross section. Within this is placed a cylindrical nut 22 having a non-circular head fitting said socket. A U-shaped sheet metal spacing piece 15 has its arms bearing against the wall of plate $7^a$ on each side of said socket piece, its head bearing against the face of plate or wall 16 and having an opening through which screw bolt 13 passes. The U-shaped spacing piece 14 has its head bearing against the wall of frame 2 and provided with an opening through which the screw bolt passes, the arms having tongues on their ends passed through slots in the wall 16 on each side of spacing member 15 and clenched over to hold said spacing member 14 in place. Wall 16 serves the purpose of supporting the ends of guard wires 23 and acts as a baffle plate to retard radiation of heat through the side walls of frame 2. Plate 7ª serves to support the electric insulating pieces 7 over which the resistance wires are wound, having for this purpose offset portions and overturned fingers 7ᵇ which hold the insulating blocks or bars in the channels formed thereby. Plate 7ª is further shaped to form a guide for holding drawer or toaster 9 between said offset portions.

In the assembling of the heating element, the plates 7ª may be placed on either side of a spacing block or temporary form and the resistance wire attached to or wound over the insulating pieces 7. This heating element is then placed in frame 2 and the ends of the resistance wires attached to the terminals 8. By inserting screws 13 through openings in side walls of frame 2 and engaging nuts 22, the plates 7ª are drawn back against the spacing pieces 14 and 15 and the resistance wires are brought under the proper tension. The spacing block or temporary form aforesaid is then easily removed through the opening 2ᵈ.

The resistance wire may be coiled helically, crimped or corrugated in such manner as to compensate for its expansion and contraction due to heating and cooling.

An important feature of my present invention is the means for electrically connecting the conducting wires to the heater.

Heretofore such connections have been usually in the form of a plug and socket brought together or separated by a relative rectilinear movement and engaging with such friction as to require the operator to hold the heater with one hand, while removing the plug with the other, especially after the parts have become somewhat corroded in use.

This is a matter of considerable annoyance and discomfort as it is usually necessary to remove the plug while the stove or heater is still hot.

Figure 7:
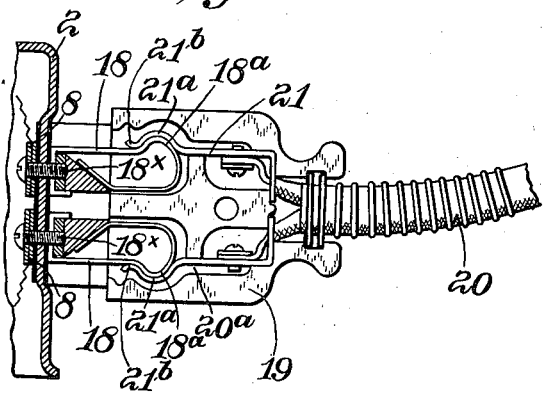
Figs. 7 and 8 are details of the electrical socket connection employed.
Figure 8:
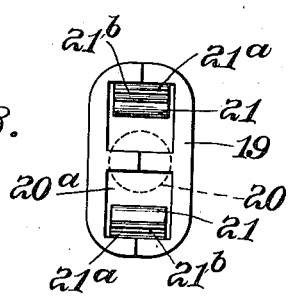

To avoid this objection I have devised a coupling which may be readily connected and disconnected by a rocking movement, the same being shown more in detail in Figs. 7 and 8.

This coupling comprises a pair of tongues or projections 18, preferably of looped sheet metal secured to the frame 2 by means of screws 18ˣ and properly insulated therefrom, and electrically connected to the resistance wires, as shown.

These tongues have oppositely directed shoulders or rounded projections 18ª and inclined end portions. A socket member 19 secured to the end of the insulated conductor 20 has within the socket 20ª thereof a pair of fingers 21 with indented portions 21ª corresponding to the projections 18ª. Either the tongues 18 or the fingers 21 or both may be made of spring metal. Preferably both tongues and fingers are made of spring metal to insure easy connection and disconnection and to aid in securing perfect electric contact when connected the fingers may have outwardly inclined or deflected ends 21ᵇ.

The space within the socket is considerably wider than the fingers 21, so as to allow lateral movement thereof, enabling the recess 21ª of one finger to engage with the shoulder 18ª of the corresponding tongue by applying the socket piece in a tilted position. By thereafter straightening the socket piece the other finger and tongue will spring into interlocking engagement with each other.

The connection may be separated by a reversal of the movement, to wit, a tilting of the socket piece out of its normal position, and both these operations of connection and disconnection may be readily effected by one hand without the necessity of taking hold of the heating device.

What I claim is:—

1. In an electric cooking device an electric heating device comprising two sets of spaced electric resistance heating elements, removable means located between said spaced sets for supporting an article to be heated with both sides exposed to said heating elements, and removable heat conserving means on opposite sides of said heating device.

2. In an electric cooking device a suitable stand or support, upper and lower sets of electric resistance heating elements carried thereby, and an openwork grid insertible, and removable from, between said sets of heating elements, said support being adapted to have a plurality of cooking vessels applied to either exterior face of said heating elements.

3. In combination a base, two sets of electric resistance heating elements supported above said base, a grid removably supported between said heating elements, and means for removably supporting a broiler beneath the lowermost set to receive heat from both sets.

CHARLES C. ARMSTRONG.